(12) United States Patent
Zanka et al.

(10) Patent No.: US 6,608,130 B1
(45) Date of Patent: Aug. 19, 2003

(54) POLYPROPYLENE-BASED RESIN COMPOSITION OF EXCELLENT MOLDABILITY AND GIVING MOLDED PRODUCT OF EXCELLENT APPEARANCE

(75) Inventors: Yukihito Zanka, Yokkaichi (JP); Mitsuhiro Murayama, Yokkaichi (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/561,929

(22) Filed: May 1, 2000

(51) Int. Cl.[7] .............................. C08K 3/34; C08L 23/12
(52) U.S. Cl. ..................... 524/451; 525/240; 525/244
(58) Field of Search ................. 525/240, 95, 232, 525/241, 88, 323, 244; 524/451, 505, 528

(56) References Cited

U.S. PATENT DOCUMENTS 6,011,102 A * 1/2000 Shimojo et al. ............. 524/451
6,147,152 A * 11/2000 Kanome et al. ............. 524/451
6,204,328 B1 * 3/2001 Sanpei et al. ................. 525/89
6,300,415 B1 * 10/2001 Okayama et al. ............ 525/191
6,300,419 B1 * 10/2001 Sehanobish et al. ........ 525/191
6,306,972 B1 * 10/2001 Ohkawa et al. ............. 525/240

* cited by examiner

*Primary Examiner*—Robert D. Harlan
(74) *Attorney, Agent, or Firm*—Oblon, Spivak, McClelland, Maier & Neustadt, P.C.

(57) ABSTRACT

The present invention provides A polypropylene-based resin composition, comprising (A) 45 to 85 wt. % of a propylene/ethylene block copolymer, having a melt flow rate (MFR) of 100 g/10 min. or more for the propylene homopolymer portion and 50 to 200 g/10 min. for the total copolymer, (B) 0.5 to 20 wt. % of a propylene homopolymer having a weight-average molecular weight (Mw) of 10,000 to 110,000, (C) 5 to 35 wt. % of an ethylene/α-olefin copolymer rubber and/or ethylene/α-olefin/non-conjugate diene copolymer rubber, and/or hydrogenated block copolymer rubber, having an MFR of 0.1 to 20 g/10 min., and (D) 5 to 30 wt. % of talc having an average particle size of 10 μm or less, determined by the laser diffraction method.

10 Claims, 1 Drawing Sheet

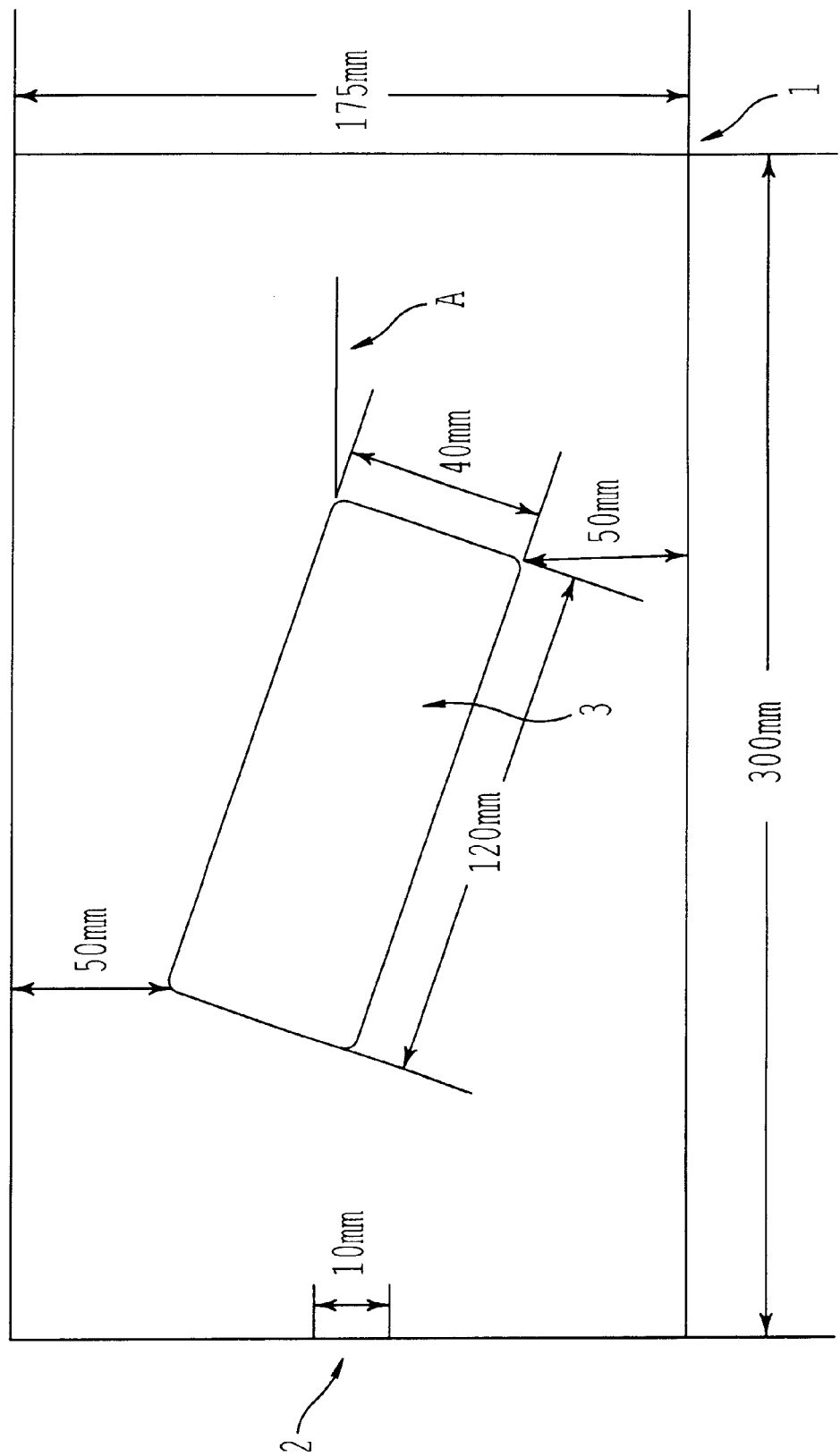

POLYPROPYLENE-BASED RESIN COMPOSITION OF EXCELLENT MOLDABILITY AND GIVING MOLDED PRODUCT OF EXCELLENT APPEARANCE

BACKGROUND OF THE INVENTION

1. Field of the Invention

The present invention relates to a polypropylene-based resin composition, which is excellent in moldability during injection molding, appearance of welded section, flexural modulus of elasticity and resistance to impact, and suitable for injection-molded parts for automobiles

2. Discussion of the Related Art

A number of attempts have been made in the past to improve impact resistance and rigidity of polypropylene resin by blending it with an ethylene/propylene polymer, various types of ethylene-based copolymer and talc. For example, resin compositions of excellent resistance to impact are disclosed by Japanese Patent Publication Nos. 63-42929 and 64-150, and Japanese Laid-open Patent Application Nos. 64-66263 and 1-204946.

More recently, resin compositions are required to be higher in fluidity and rigidity to satisfy the demands for shortened molding cycles, and thinner products and larger parts. The above compositions are insufficient in moldability for the above purposes.

An attempt has been made to solve the above problems, as disclosed by Japanese Laid-open Patent Application No. 7-53843. This composition, however, is still insufficient in fluidity to satisfy the requirements by a high-cycle molding process affected at low pressure, which needs still higher fluidity.

It is generally accepted that increasing the melt flow rate (MFR) of a resin composition to improve its moldability tends to be accompanied by deteriorated appearance of the welded sections of the molded product thereof. Excessive deterioration of the weld line lowers the product value.

Resin compositions free of the problems associated with weld appearance are proposed by, e.g., Japanese Laid-open Patent Application Nos. 9-263665 and 9-71714. They are good in weld appearance, but insufficient in fluidity.

SUMMARY OF THE INVENTION

It is an object of the present invention to provide a polypropylene-based resin composition, exhibiting high fluidity, while retaining good additional properties and weld appearance; excellent in moldability and molding fabricability; and suitable for automobile exterior parts, e.g., bumpers, while solving the above problems.

The inventors of the present invention have found that a polypropylene-based resin composition showing high fluidity, and good additional properties and weld appearance, and which is excellent in moldability and molding fabricability can be obtained by incorporating a propylene/ethylene block copolymer having a propylene homopolymer portion of high fluidity and very high crystallinity with a propylene homopolymer component of low molecular weight, ethylene/α-olefin copolymer rubber and/or ethylene/α-olefin/non-conjugated diene copolymer rubber, and/or hydrogenated block copolymer rubber, and talc having a specific range in particle size, reaching the present invention.

More concretely, the present invention provides the polypropylene-based resin composition, comprising the following components (A) to (D):

(A): 45 to 85 wt. % of a propylene/ethylene block copolymer, having a melt flow rate (MFR) of 100 g/10 min. or more for the propylene homopolymer portion and 50 to 200 g/10 min. for the total copolymer, (B): 0.5 to 20 wt. % of a propylene homopolymer having a weight-average molecular weight (Mw) of 10,000 to 110,000, (C): 5 to 35 wt. % of an ethylene/α-olefin copolymer rubber and/or ethylene/α-olefin/non-conjugate diene copolymer rubber, and/or hydrogenated block copolymer rubber, having an MFR of 0.1 to 20 g/10 min, and (D): 5 to 30 wt. % of talc having an average particle size of 10 μm or less, determined by the laser diffraction method, where the % weights are based on the total weight of the composition.

BRIEF DESCRIPTION OF DRAWINGS

FIG. 1 shows the molded shape for evaluating weld appearance in each of the Examples and Comparative Examples.

DETAILED DESCRIPTION OF THE INVENTION

The present invention is directed to a propylene-based resin composition comprising (A) a propylene/ethylene block copolymer, (B) a propylene homopolymer of low molecular weight, (C) an ethylene/α-olefin copolymer rubber and/or ethylene/α-olefin/non-conjugated diene copolymer rubber, and/or hydrogenated block copolymer rubber, and (D) talc. Each of these components is described below in detail.

I. Resin Components (A) (Propylene/Ethylene Block Copolymer (Component (A))

(1) Properties of the Propylene/Ethylene Block Copolymer

The propylene/ethylene block copolymer as Component (A) of the present invention has a melt flow rate (MFR), determined at 230° C. and a load of 2.16 kg, of 50 to 200 g/10 min, preferably 50 to 160 g/10 min, more preferably 60 to 140 g/10 min MFR below the above range may cause problems resulting from insufficient fluidity, e.g., need for a molder of high clamping force when the resin composition is molded into thin-wall products or for higher molding temperature, which decrease productivity. MFR exceeding the above range, on the other hand, tends to deteriorate characteristics related to weld appearance.

MFR of the propylene/ethylene block copolymer may be adjusted during the polymerization process, or by treating with an organic peroxide, e.g., diacyl peroxide or dialkyl peroxide, after the polymerization.

The propylene homopolymer portion of the propylene/ethylene block copolymer has an MFR of 100 g/10 min or more, preferably 100 to 400 g/10 min, more preferably 120 to 300 g/10 min, most preferably 130 to 280 g/10 min. MFR below the above range may cause insufficient fluidity of the propylene-based resin composition. MFR exceeding the above range, on the other hand, tends to deteriorate its weld appearance.

(2) Production of the Propylene/Ethylene Block Copolymer

The propylene/ethylene block copolymer is produced in the presence of a catalyst of high stereoregularity. The examples of the methods for producing such a catalyst include combining titanium trichloride composition, obtained by reducing titanium tetrachloride with an organoaluminum compound and treating it with a varying type of electron donor and acceptor, with an organoaluminum compound and aromatic carboxylate ester (as disclosed by Japanese Laid-open Patent Application Nos. 56-100806, 56-120712 and 58-104907), and contacting a magnesium halide with titanium tetrachloride and a varying type of electron donor, to produce a supported catalyst (as disclosed by Japanese Laid-open Patent Application Nos, 57-63310, 63-43915 and 63-83116).

The copolymer can be obtained by polymerizing propylene and ethylene in the presence of the above catalyst by various production processes, e.g., vapor-phase fluidized bed, solution and slurry processes.

(3) Compounding Ratio

The above propylene/ethylene block copolymer is incorporated in the propylene-based resin composition of the present invention at 45 to 85 wt. %, preferably 50 to 80 wt. %, more preferably 50 to 70 wt. %, based on the weight of the total composition.

The propylene-based resin composition may be insufficient in fluidity at a copolymer content below the above range, and conversely insufficient in impact resistance at a content exceeding the above range.

(By Propylene Homopolymer of Low Molecular Weight (Component (B))

(1) Properties of the Propylene Homopolymer of Low Molecular Weight

The propylene homopolymer of low molecular weight as Component (B) for the present invention has a weight-average molecular weight of 10,000 to 110,000, determined by gel permeation chromatography (GPC), preferably 20,000 to 80,000, more preferably 25,000 to 60,000. Its fluidity-improving effect may be insufficient at a molecular weight above 110,000, and conversely its properties may be adversely affected at below 10,000.

(2) Production of the Propylene Homopolymer of Low Molecular Weight

The propylene homopolymer of low molecular weight may be produced by the polymerization method similar to that used for producing Component (A). It may be also thermally decomposed under heating at about 350° C. for about 1 hour, or treated with an organic peroxide, e.g., diacyl peroxide or dialkyl peroxide, to adjust its properties.

(3) Compounding Ratio

The above propylene homopolymer of low molecular weight is incorporated in the propylene-based resin composition of the present invention at 0.5 to 20 wt. %, preferably 1 to 10 wt. %, more preferably 1 to 8 wt. %, based on the total weight of the composition. Its fluidity-improving effect may be insufficient at a content below the above range, and the propylene-based resin composition may be conversely insufficient in impact resistance at a content exceeding the above range.

(C) Ethylene/α-olefin Copolymer Rubber, Ethylene/α-olefin/Non-Conjugated Diene coplymer rubber, and/or hydrogenated block copolymer rubber (Component (C))

The ethylene/α-olefin copolymer rubber, ethylene/α-olefin/non-conjugated diene copolymer rubber, and/or hydrogenated block copolymer rubber are used as Component (C) for the propylene-based resin composition of the present invention, to improve its impact resistance.

Examples of the ethylene/α-olefin copolymer rubber or ethylene/α-olefin non-conjugated diene copolymer rubber include ethylene/propylene copolymer rubber, ethylene/1-butene copolymer rubber, ethylene/1-hexene copolymer rubber, ethylene/1-octene copolymer rubber, and ethylene/propylene/non-conjugated diene copolymer rubber (EPDM). The ethylene/α-olefin copolymer rubber or ethylene α-olefin/non-conjugated diene copolymer rubber has an MFR, determined at 230° C. and a load of 2.16 kg, of 0.1 to 20 g/10 min, preferably 0.5 to 13 g/10 min, more preferably 0.5 to 10 g/10 min. MFR below the above range may cause insufficient dispersibility of the copolymer rubber and hence insufficient impact resistance of the propylene-based resin composition. MFR exceeding the above range, on the other hand, tends to deteriorate its weld appearance.

Various types of the ethylene/α-olefin copolymer rubber or ethylene/α-olefin non-conjugated diene copolymer rubber may be used either individually or in combination.

Examples of the hydrogenated block copolymer rubber for the composition of the present invention include hydrogenated styrene/butadiene/styrene triblock copolymer (SEBS) and hydrogenated styrene/isoprene/styrene triblock copolymer (SEPS).

The hydrogenated block copolymer rubber has an MFR, determined at 230° C. and a load of 2.16 kg, of 0.5 to 20 g/10 min, preferably 0.5 to 13 g/10 min, more preferably 0.5 to 10 g/10 min. MFR below the above range may cause insufficient fluidity of the propylene-based resin composition. MFR exceeding the above range, on the other hand, tends to deteriorate its weld appearance. Various types of the hydrogenated block copolymer rubber may be used either individually or in combination.

(2) Production of the Ethylene/α-olefin Copolymer Rubber or Ethylene/α-olefin Non-Conjugated Diene Copolymer Rubber The ethylene/α-olefin copolymer rubber or ethylene/α-olefin/non-conjugated diene copolymer rubber may be produced by polymerization in the presence of a catalyst, e.g., a titanium compound (e.g., titanium halide), a vanadium compound, a Ziegler organoaluminum/magnesium complex (e.g., alkyl aluminum/magnesium complex, alkyl alkoxy aluminum/magnesium complex, alkyl aluminum, alkyl aluminum chloride) or a metallocene catalyst (e.g., that disclosed by WO-91/04257). The copolymer will have more preferable effects, when produced in the presence of a vanadium or metallocene compound. It can be obtained by various polymerization processes, e.g., vapor-phase fluidized bed, solution and slurry processes.

(3) Production of the Hydrogenated Block Copolymer Rubber

These triblock copolymers can be produced by the well-known anion living polymerization method. For example, styrene, butadiene and styrene are consecutively polymerized to produce the triblock copolymer, SBS, which is subsequently hydrogenated to produce SEBS, or a diblock copolymer of styrene and butadiene is first produced, and it is transformed into the triblock copolymer in the presence of a coupling agent and then hydrogenated. Butadiene may be replaced by isoprene, to produce the hydrogenated styrene/isoprene/styrene triblock copolymer (SEPS).

(4) Compounding Ratio

The above ethylene/α-olefin copolymer rubber and/or ethylene/α-olefin/non-conjugated diene copolymer rubber, and/or hydrogenated block copolymer rubber are incorporated in the propylene-based resin composition of the present invention at 5 to 35 wt. %, preferably 7 to 33 wt. %, more preferably 9 to 30 wt. %, based on the total weight of the composition. Its effect of improving impact resistance may be insufficient at a content below the above range, and the propylene-based resin composition may be conversely insufficient in fluidity at a content exceeding the above range.

(D) Talc (Component (D))

(1) Properties of Talc

Talc as Component (D) for the polypropylene-based resin composition of the present invention has an average particle size of 10 μm or less, preferably 0.5 to 8 μm. Particle size beyond the above range is undesirable, because it may cause insufficient flexural modulus of elasticity of the polypropylene-based resin composition.

The average particle size can be determined by reading the size at a cumulative content of 50 wt. % in the particle size cumulative distribution curve, which is drawn based on the data obtained by laser-aided diffractometry (using, e.g., Horiba Seisakusho's LA920W) or light transmission method based on liquid layer sedimentation (using, e.g., Shimadzu's CP). The average particle size in this specification was determined by the former method.

The talc can be obtained by finely crushing naturally occurring talc, by a mechanical means, and classifying the particles precisely. The crushed particles may be classified first roughly and then more precisely.

The mechanical means include crushers, e.g., jaw, hammer, roll and jet crushers, and mills, e.g., screen, colloid, roll and vibration mills.

The crushed talc particles are classified by the wet or dry method once or repeatedly to adjust their average aspect ratio, particle size and size distribution required for the present invention. The useful devices for classifying them include cyclone, cyclone air separator, micro separator, and sharp-cut separator. It is preferable to crush the talc to have a size in a specific range, and classify the crushed particles by a sharp-cut separator, to prepare the talc for the present invention.

The talc particles may be surface-treated with a variety of agents, e.g., organotitanate-based coupling agent, organosilane coupling agent, unsaturated carboxylic acid, modified polyolefin grafted with the anhydride thereof, fatty acid, metallic salt of fatty acid, and ester of fatty acid.

(2) Compounding Ratio

The talc is incorporated in the propylene-based resin composition of the present invention at 5 to 30 wt. %, preferably 7 to 25 wt. %, based on the total weight of the composition.

The propylene-based resin composition may have an insufficient flexural modulus of elasticity at a talc content below the above range, and insufficient impact resistance at a content exceeding the above range.

(E) Additional Components (Optional)

The propylene-based resin composition of the present invention may be incorporated with, in addition to the above essential components (A) to (D), one or more of additional components (optional components), so long as the effect of the present invention is not notably adversely affected.

These additional components (optional components) useful for the present invention include antioxidant (e.g., phenol- and phosphorus-based antioxidant); weathering-inhibiting agent (hindered amine-, benzophenone- and benzotriazole-based agents); nucleating agent (e.g., organoaluminum and organophosphorus compounds); dispersant (represented by a metallic salt of stearic acid); colorant (e.g., quinacridon, perylene, phthalocyanine, titanium oxide and carbon black); whiskers (e.g., those of fibrous potassium titanate, fibrous magnesium oxysulfate, fibrous aluminum borate and calcium carbonate), and fibers (e.g., those of carbon and glass).

II. Production of Polypropylene-Based Resin Composition (1) Kneading

The polypropylene-based resin composition of the present invention can be obtained by uniformly mixing and kneading the above components. The method therefor is not limited. Some of the commonly used methods include dry blending by a mixer (e.g., Henschel mixer and tumbler), followed by kneading at a set temperature of 180 to 250° C. by an extruder, Banbury mixer, roll, Brabender Plastograph, or kneader. Of these, an extruder (in particular twine screw) is preferable.

(2) Molding

The molding method for the polypropylene-based resin composition of the present invention is not limited, and the common ones for synthetic resin (e.g., injection, injection compression, and blow molding) can be used. Of these, injection molding is preferable because of the exhibited superior effects.

III. Polypropylene-Based Resin Composition (1) Properties

The polypropylene-based resin composition of the present invention, prepared by the above method, has the following properties, good moldability during injection molding, excellent flexural modulus of elasticity and impact resistance, and good weld appearance after being molded.

(a) MFR of 30 g/10 min or more, (b) flexural modulus of elasticity of 13,000 Kg/cm$^2$ or more, and (c) Izod impact value of 10 kg/cm$^2$ or more.

(2) Purposes

The polypropylene-based resin composition of the present invention, capable of exhibiting the above performances, can be molded into a variety of products. It is particularly suitable for injection-molded products, including automobile exterior parts, e.g., bumpers, side protectors and over fenders.

Having generally described this invention, a further understanding can be obtained by reference to certain specific examples which are provided herein for purposes of illustration only and are not intended to be limiting unless otherwise specified.

EXAMPLES

Obviously, numerous modifications and variations of the present invention are possible in light of the above teachings. It is therefore to be understood that within the scope of the appended claims, the invention may be practiced otherwise than as specifically described herein.

Measurement Methods (1) MFR: MFR was determined at 230° and a load of 2.16 kg, in accordance with ASTM-D1238.

(2) Flexural modulus of elasticity: Flexural modulus of elasticity was determined at 23° C. and a bending speed of 2 mm/min, in accordance with ASTM-D790.

(3) Impact resistance: Impact resistance was evaluated by Izod impact value, determined at 23° C. in accordance with ASTM-D790.

(4) Weld appearance: A 4-mm thick flat plate model 1 with an opening 3 and having a gate 2 (see FIG. 1) was prepared by injection molding carried out at 220° C. The length of the weld line at section A was measured.

Stocks (1) Propylene/ethylene block copolymer (Component (A))

TABLE 1

Propylene/ethylene block copolymer (Component (A))

| Types | Propylene homopolymer portion MFR (g/10 min) | Block copolymer MFR (g/10 min) | Block copolymer Ethylene content (wt. %) |
|---|---|---|---|
| PP-1 | 150 | 65 | 4.7 |
| PP-2 | 250 | 150 | 3.9 |
| PP-3 | 110 | 50 | 5 |
| PP-4 | 350 | 200 | 3.8 |
| PP-5 | 90 | 40 | 4.1 |

(2) Propylene polymer of low molecular weight (Component (B)), (hereinafter referred to as modifier component)

TABLE 2

Modified component (Component (B))

| TYPE | Weight-average molecular weight |
|---|---|
| Modifier-1 | 40,000 |
| Modifier-2 | 60,000 |
| Modifier-3 | 120,000 |

(3) Ethylene/α-olefin copolymer rubber, ethylene/α-olefin/non-conjugate diene copolymer rubber, or hydrogenated block copolymer rubber (Component (C), (hereinafter referred to as elastomer component).

TABLE 3

Elastomer component (Component (C))

| Types | MFR (g/10 min) | Types |
|---|---|---|
| Elastomer-1 | 1.2 | Ethylene/1-octene copolymer |
| Elastomer-2 | 1.3 | Ethylene/1-butene copolymer |
| Elastomer-3 | 4.1 | SEPS |
| Elastomer-4 | 1.5 | Ethylene/propylene/ethylidenenorbornene copolymer (EPDM) |
| Elastomer-5 | 40 | Ethylenle/1-octene copolymer |

(4) Talc (Component (D)

TABLE 4

Talc component (Component (D)

| Types | Average particle size (μm) |
|---|---|
| Talc-1 | 7 |
| Talc-2 | 18 |

EXAMPLES 1 TO 12, AND COMPARATIVE EXAMPLES 1 TO 9

The stocks shown in Tables 1 to 4 were compounded in a ratio shown in Tables 5 to 6, and 100 wt. parts of each composition prepared above was incorporated with 0.1 wt. parts of tetrakis[methylene-3-(3'5'-di-t-butyl-4'-hydroxyphenyl)propionate] methane (Ciba Geigy's IRGANOX1010) and 0.3 wt. parts of magnesium stearate. These components were mixed by a mixer (Kawada Seisakusho's super mixer) for 5 min and kneaded/granulated at a set temperature of 210° C. by a biaxial kneader (Kobe Steel's 2FCM), to prepare the polypropylene-based resin composition.

Each composition was molded at a molding temperature of 210° C. and clamping force of 350 tons into a shape, which was measured by the above methods. The evaluation results are given in Tables 7 to 8.

TABLE 5

| EXAMPLE | PP Types | PP wt. % | Modifier Types | Modifier wt. % | Elastomer Types | Elastomer wt. % | Talc Types | Talc wt. % |
|---|---|---|---|---|---|---|---|---|
| 1 | PP-1 | 53 | Modifier-1 | 5 | Elastomer-1 | 22 | Talc-1 | 20 |
| 2 | PP-1 | 56 | Modifier-1 | 2 | Elastomer-1 | 22 | Talc-1 | 20 |
| 3 | PP-1 | 40 | Modifier-1 | 12 | Elastomer-1 | 28 | Talc 1 | 20 |
| 4 | PP-1 | 65 | Modifier-1 | 5 | Elastomer-1 | 10 | Talc-1 | 20 |
| 5 | PP-1 | 63 | Modifier-1 | 5 | Elastomer-1 | 22 | Talc-1 | 10 |
| 6 | PP-1 | 48 | Modifier-1 | 5 | Elastomer-1 | 22 | Talc-1 | 25 |
| 7 | PP-2 | 53 | Modifier-1 | 5 | Elastomer-1 | 22 | Talc-1 | 20 |
| 8 | PP-3 | 53 | Modifier-1 | 5 | Elastomer-1 | 22 | Talc-1 | 20 |
| 9 | PP-1 | 53 | Modifier-2 | 5 | Elastomer-1 | 22 | Talc-1 | 20 |
| 10 | PP-1 | 53 | Modifier-1 | 5 | Elastomer-2 | 22 | Talc-1 | 20 |
| 11 | PP-1 | 53 | Modifier-1 | 5 | Elastomer-3 | 22 | Talc-1 | 20 |
| 12 | PP-1 | 53 | Modifier-1 | 5 | Elastomer-4 | 22 | Talc-1 | 20 |

TABLE 6

| COMPARATIVE EXAMPLE | PP Types | wt. % | Modifier Types | wt. % | Elastomer Types | wt. % | Talc Types | wt. % |
|---|---|---|---|---|---|---|---|---|
| 1 | PP-1 | 58 | Modifier-1 | 0 | Elastomer-4 | 22 | Talc-1 | 20 |
| 2 | PP-1 | 43 | Modifier-1 | 15 | Elastomer-1 | 22 | Talc-1 | 20 |
| 3 | PP-1 | 30 | Modifier-1 | 2 | Elastomer-1 | 35 | Talc-1 | 33 |
| 4 | PP-1 | 94 | Modifier-1 | 2 | Elastomer-1 | 2 | Talc-1 | 2 |
| 5 | PP-4 | 58 | Modifier-1 | 0 | Elastomer-1 | 22 | Talc-1 | 20 |
| 6 | PP-1 | 56 | Modifier-1 | 2 | Elastomer-5 | 22 | Talc-1 | 20 |
| 7 | PP-1 | 56 | Modifier-3 | 2 | Elastomer-1 | 22 | Talc-1 | 20 |
| 8 | PP-1 | 56 | Modifier-1 | 2 | Elastomer-1 | 22 | Talc-2 | 20 |
| 9 | PP-5 | 56 | Modifier-I | 2 | Elastomer-1 | 22 | Talc-1 | 20 |

TABLE 7

| | | Properties | | |
|---|---|---|---|---|
| EXAMPLE | MFR (g/10 min) | Flexural modulus of elasticity (kg/cm$^2$) | Izod impact (kg/cm$^2$) | Weld appearance (mm) |
| 1 | 36 | 22500 | 35 | 12 |
| 2 | 31 | 21500 | 45 | 11.5 |
| 3 | 42 | 19000 | 20 | 12.7 |
| 4 | 55 | 28500 | 10 | 9 |
| 5 | 39 | 17000 | 19 | 8 |
| 6 | 34 | 25000 | 53 | 16 |
| 7 | 52 | 23000 | 29 | 19 |
| 8 | 33 | 21500 | 45 | 10 |
| 9 | 31 | 21400 | 35 | 12 |
| 10 | 33 | 22000 | 31 | 10 |
| 11 | 40 | 22000 | 50 | 13 |
| 12 | 35 | 22200 | 28 | 10 |

TABLE 8

| | | Properties | | |
|---|---|---|---|---|
| COMPARATIVE EXAMPLE | MFR (g/10 min) | Flexural modulus of elasticity (kg/cm$^2$) | Izod impact (kg/cm$^2$) | Weld appearance (mm) |
| 1 | 26 | 21600 | 44.4 | 11.5 |
| 2 | 61 | 22500 | 8 | 12.5 |
| 3 | 11 | 20000 | 40 | 20 |
| 4 | 60 | 16000 | 3 | 9 |
| 5 | 70 | 22000 | 30 | 29 |
| 6 | 60 | 23500 | 40 | 26 |
| 7 | 28 | 21500 | 45 | 13 |
| 8 | 38 | 12500 | 38 | 11 |
| 9 | 20 | 22000 | 43 | 11 |

The polypropylene-based resin composition of the present invention, capable of exhibiting the above performances, can be molded into a variety of products. It is particularly suitable for injection-molded products, including automobile exterior parts, e.g., bumpers, side protectors and over fenders.

What is claimed is:

1. A polypropylene resin composition, comprising
(A) 45 to 85 wt. %, based on the total weight of the composition, of a propylene/ethylene block copolymer, having a melt flow rate (MFR) of 100 g/10 min or more for the propylene homopolymer portion and 50 to 200 g/10 min for the total copolymer;
(B) 0.5 to 20 wt. %, based on the total weight of the composition, of a propylene homopolymer having a weight-average molecular weight (Mw) of 20,000 to 80,000;
(C) 5 to 35 wt. %, based on the total weight of the composition, of a polymer selected from the group consisting of an ethylene/α-olefin copolymer rubber, an ethylene/α-olefin/non-conjugated diene copolymer rubber, a hydrogenated block copolymer rubber and mixtures thereof, wherein said component (C) has an MFR of 0.1 to 20 g/10 min, and
(D) 5 to 30 wt. %, based on the total weight of the composition, of talc having an average particle size of 10 μm or less, determined by the laser diffraction method.

2. The composition of claim 1, wherein said component (A) has an MFR of 100 g/10 min to 400 g/10 min for the propylene homopolymer and 50 to 160 g/10 min for the total copolymer; said component (C) has an MFR of 0.5 to 13 g/10 min; and said component (D) has an average particle size of 0.5 to 8 μm.

3. The composition of claim 1, wherein
(A) is present in an amount of from 50 to 80 wt. %, based on the total weight of the composition, of a propylene/ethylene block copolymer, having a melt flow rate (MFR) of 100 to 400 g/10 min for the propylene homopolymer portion, and 50 to 160 g/10 min for the total copolymer,
(B) is present in an amount of from 1 to 10 wt. %, based on the total weight of the composition, of a propylene homopolymer having a weight-average molecular weight (Mw) of 20,000 to 80,000;
(C) is present in an amount of from 7 to 33 wt. %, based on the total weight of the composition, of a copolymer selected from the group consisting of an ethylene/α-olefin copolymer rubber, an ethylene/α-olefirlnon-conjugated diene copolymer rubber, a hydrogenated block copolymer rubber and mixtures thereof; wherein said component (C) has an MFR of 0.5 to 13 g/10 min; and
(D) is present in an amount of from 7 to 25 wt. %, based on the total weight of the composition, of talc having an average particle size of 0.5 to 8 μm, determined by the laser diffraction method.

4. The composition of claim 1, which has the following properties, MFR of 30 g/10 min or more, flexural modulus of elasticity of 13,000 kg/cm$^2$ or more; and Izod impact value of 10 kg/cm$^2$ or more.

5. The composition of claim 1, wherein said component (A) has an MFR of 130 g/10 min to 280 g/10 min for the propylene homopolymer.

6. The composition of claim 1, wherein said component (A) has an MFR of 60 to 140 g/10 min for the total copolymer.

7. The composition of claim 1, wherein said component (B) has a weight-average molecular weight (Mw) of 25,000 to 60,000.

8. The composition of claim 1, wherein said component (C) has an MFR of 0.5 to 1 g/10 min.

9. The composition of claim 1, wherein said component (A) is present in an amount of 50 to 70 wt. %; said component (B) is present in an amount of 1 to 8 wt. %; said component (C) is present in an amount of 9 to 30 wt. %; all based on the total weight of the composition.

10. The composition of claim 1, further comprising component (E), an additive selected from the group consisting of an antioxidant, a weathering-inhibiting agent, a nucleating agent, a dispersant, a colorant, whiskers and fibers.

* * * * *